May 16, 1950 J. D. OLIVER 2,508,284
BRUSH AND ROOT CUTTER
Filed Nov. 20, 1946 2 Sheets-Sheet 1
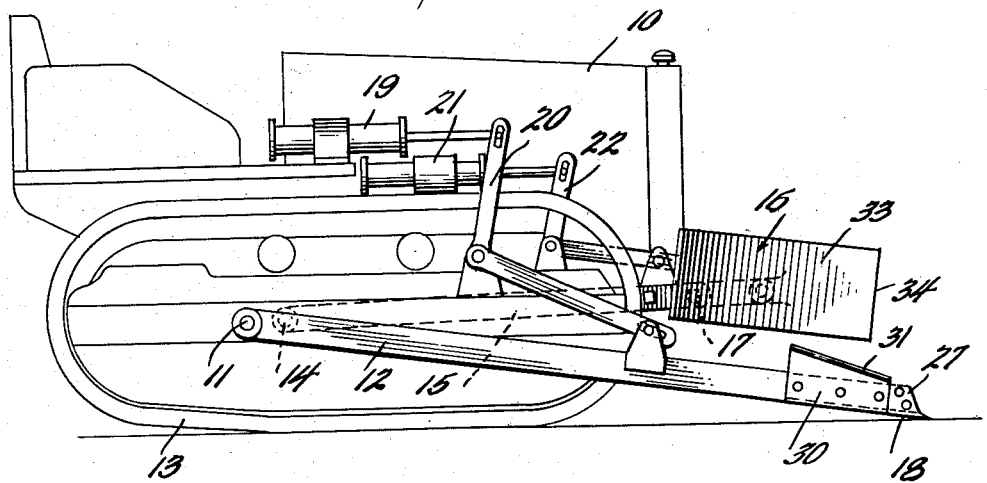
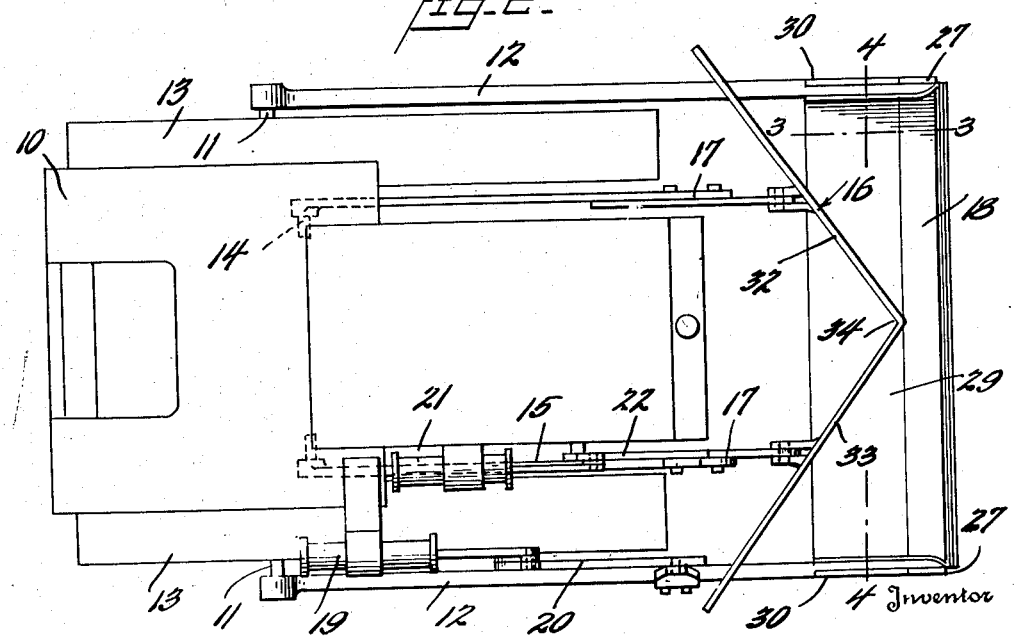
Inventor
J. D. Oliver
By Watson, Cole, Grindle & Watson
Attorneys

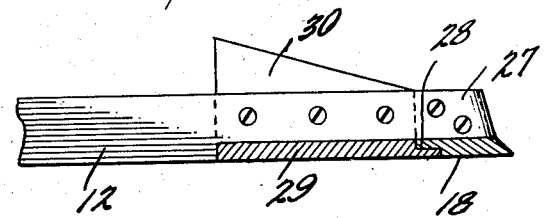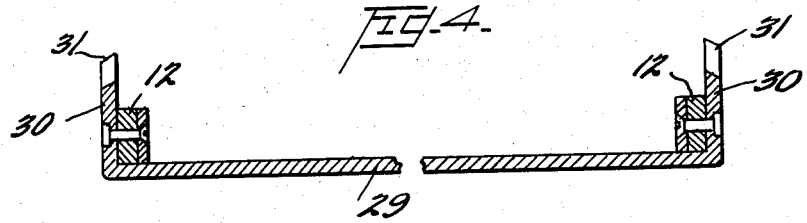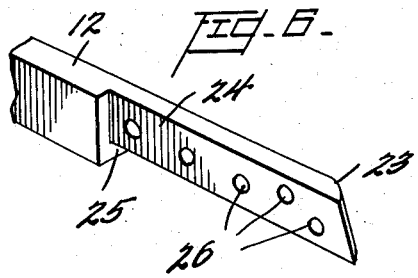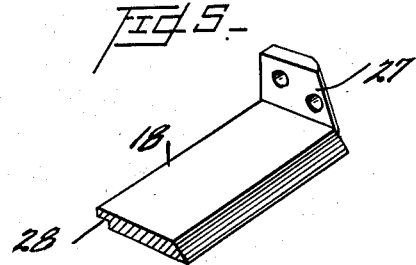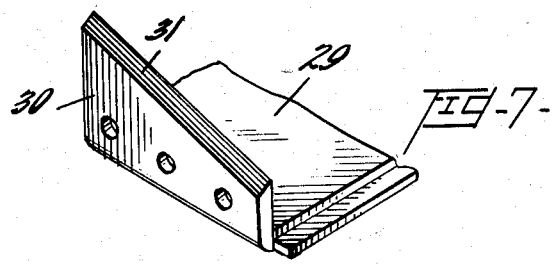

Patented May 16, 1950

2,508,284

UNITED STATES PATENT OFFICE 2,508,284

BRUSH AND ROOT CUTTER

Jason D. Oliver, McNeal, Ariz.

Application November 20, 1946, Serial No. 711,157

5 Claims. (Cl. 37—2)

1

The present invention relates to devices for clearing brushy land for agricultural purposes, and more particularly to a device for use with a power driven vehicle, such as a crawler tractor, for use in cutting off, uprooting and stacking in windrows the roots, stems or trunks, branches and foliage of small and medium size plants such as do not have to be felled before uprooting.

Many as yet uncultivated areas of the world are covered with thick growths of grasses, bushes, shrubs and small trees which must be cleared away, root, stump and foliage, before the land can be put to productive use. Heretofore, the work of clearing such land has been done by hand, piecemeal and laboriously, or has been attempted by large earthmoving equipment such as bulldozers and the like, with poor results. In the latter case the land is usually left in poor shape, with roots and brush only partly removed and with its surface a sea of hummocks and riffles, topsoil obscured by sub-soil, and with piles of roots and brush so thoroughly mixed with soil that neither the wood nor the soil can economically be used.

Accordingly, it is an object of the present invention to provide a device for use with a power operated vehicle, for example a large crawler tractor, which comprises a sub-surface cutter blade adjustable in elevation, for cutting grass or brush-roots at the desired level while leaving the soil relatively undisturbed, with a brush-plow, also adjustable in elevation, for sweeping the grass, brush and appended root portions into windrows where they may be easily collected and burned or otherwise utilized.

Other and further objects and advantages will be apparent from the description which follows, taken in connection with the accompanying drawings in which Figure 1 is a side elevation of a tractor to which the device of this invention is applied;

Figure 2 is a plan view of the device of Figure 1;

Figure 3 is a fragmentary section on line 3—3 of Figure 2;

Figure 4 is a section on line 4—4 of Figure 2; and

Figures 5, 6 and 7 are fragmentary perspective views illustrating details of the cutter blade, blade-supporting arms, and backing plate, respectively.

In order to facilitate an understanding of the invention, reference is made to the embodiments thereof shown in the accompanying drawings, and detailed descriptive language is employed. It will nevertheless be understood that no limitation of the invention is thereby intended and that various changes and alterations are contemplated such as would ordinarily occur to one skilled in the art to which the invention relates.

Referring now to Figures 1 and 2, it will be seen that the device of the invention has been applied to a crawler tractor 10 such as is commonly used in connection with earthmoving equipment. On suitable trunnions 11, on either side of the tractor, the arms 12 are mounted for pivotal movement in parallel vertical arcs. The trunnions 11 preferably extend outwardly of the tracks 13 of the tractor, so that the arms 12 may be widely spaced.

Similar trunnions 14, located inwardly of the tracks 13, provide fulcrums for the arms 15, which support the brush plow 16, as hereinafter described. The arms 15 are adjustable in length as indicated at 17, in order to permit variation of the distance between the plow 16 and the cutter blade 18 carried by the arms 12. The cutter blade 18 is supported between the arms 12 as hereinafter described. The arms 12 and cutter blade are controlled in elevation by means of a hydraulic jack 19 connected to one of the arms 12 through the bell crank 20, while the plow 16 and arms 15 are similarly but independently controlled by the hydraulic jack 21 and bell crank 22. Obviously, if necessary, the jacks and cranks may be duplicated on the opposite side of the tractor.

Attention is now invited to the details of the mounting of the cutter blade 18 between the arms 12. Referring to Figure 6, which shows the forward end of the right-hand arm 12, it will be seen that the forward extremity of the latter is rounded off on its inner corner, as at 23, which somewhat facilitates its progress through the soil. Both the outer face and underside of the arm are rabbeted or recessed, as at 24 and 25, respectively, and the arm is provided with a series of bolt holes 26.

Referring now to Figures 3 and 5, it is seen that the cutter blade 18 is bevelled and sharpened along its forward edge and is formed with upturned ends 27 which embrace the forward ends of the arms 12 and are bolted thereto, the bolt heads and nuts being countersunk to avoid friction with the soil. The rear edge of the blade 18 is rabbeted as at 28, to receive the oppositely rabbeted forward edge of a backing plate 29 (Figure 7) which backs up the cutter blade and strengthens it against bending, breaking or twisting, as well as promoting rigidity and strength of the entire assembly. The backing plate 29 has upturned ends 30 which likewise embrace the arms 12 and are bolted thereto, the upper edges 31 of the ends 30 being inclined upwardly and rearwardly, and likewise being bevelled and sharpened. These latter edges extend above the upper surfaces of the arms 12.

From the foregoing it will be apparent that as the cutter is advanced at a suitable depth below the surface of the soil, vertically extending roots will be severed by the blade 18, while any shallow, transversely extending roots will be severed by the edges 31.

The brush plow 16 comprises two plates or vanes 32, 33 joined at 34 at a horizontal angle of the order of 90°. These vanes preferably extend laterally beyond the arms 12 and are mounted in any suitable manner on the ends of the respective arms 15. As the cutter is advanced through the soil, cutting the roots of the brush or other undesired growth, the plow 16 pushes the severed brush to either side, forming windrows. The soil, flowing smoothly over the blade 18 and backing plate 29, is little disturbed and, moreover, no subsoil is brought to the surface. In this manner the undesired growth may be easily, cheaply and quickly removed, and the land left ready for cultivation.

Having thus described the invention, what is claimed as new and desired to be secured by Letters Patent is:

1. A brush and root cutting device for use with a power driven vehicle, comprising a pair of arms pivoted on the respective sides of said vehicle, said arms extending forwardly of the vehicle, a cutter blade secured to and extending between said arms at their forward ends and arranged in a plane substantially parallel to that of said arms, means for raising and lowering said arms about said pivot points, a second pair of arms pivoted on the respective sides of said vehicle, a brush plow supported by the forward ends of said second pair of arms and above the plane and rearwardly of said cutter blade, and means for varying the elevation of said brush plow relative to said cutter blade.

2. A device according to claim 1, in combination with a crawler type tractor, said first pair of arms being mounted laterally outward of the tracks of said tractor and said second pair of arms being mounted laterally inward thereof.

3. A device according to claim 1, said means for operating said first pair of arms and said means for operating said brush plow comprising hydraulic devices mounted on said vehicle.

4. A device according to claim 1, said brush plow comprising a pair of vanes arranged in generally vertical planes intersecting in a V-shape, the outer edges of said vanes projecting substantially beyond said first arms, respectively.

5. A brush and root cutting device for use with a power driven vehicle, comprising a pair of arms pivoted on the respective sides of said vehicle and extending forwardly thereof, a cutter blade secured to and extending between the forward ends of said arms, and means for raising and lowering said arms about said pivot points, and a backing member secured to said arms behind and abutting said cutter blade, said backing member having upturned end portions engaging and extending above said respective arms, the upper edges of said upturned portions being inclined and bevelled.

JASON D. OLIVER.

REFERENCES CITED

The following references are of record in the file of this patent:

UNITED STATES PATENTS

| Number | Name | Date |
|---|---|---|
| 2,173,406 | Wilkinson | Sept. 19, 1939 |
| 2,336,124 | Phoenix | Dec. 7, 1943 |
| 2,341,853 | Austin | Feb. 15, 1944 |
| 2,344,584 | Austin | Mar. 21, 1944 |